United States Patent [19]

Brodzinksy

[11] 3,803,427

[45] Apr. 9, 1974

[54] FREQUENCY MULTIPLIER AND HIGH FREQUENCY GENERATOR

[75] Inventor: Albert Brodzinksy, Washington, D.C.

[73] Assignee: The United States of America as represented by the Secretary of the Navy, Washington, D.C.

[22] Filed: Feb. 22, 1972

[21] Appl. No.: 228,183

[52] U.S. Cl. .............. 307/220, 307/311, 317/235 N

[51] Int. Cl. ........................................... H03k 21/00

[58] Field of Search .................... 307/220, 311, 224; 317/235, 235 N

[56] References Cited

UNITED STATES PATENTS

| | | | |
|---|---|---|---|
| 3,378,688 | 4/1968 | Kabell | 307/311 |
| 3,389,341 | 6/1968 | Thomas | 307/311 |
| 3,430,112 | 2/1969 | Hilbourne | 317/235 |
| 3,445,686 | 5/1969 | Rutz | 307/311 |
| 3,492,621 | 1/1970 | Yamada | 317/235 |
| 3,546,632 | 12/1970 | Buchy | 307/311 |
| 3,609,375 | 9/1971 | Bloom | 317/235 N |
| 3,617,753 | 11/1971 | Kato | 317/235 N |
| 3,688,302 | 8/1972 | Lampkin | 307/311 |
| 3,725,803 | 4/1973 | Yoder | 317/235 |
| 3,731,161 | 5/1973 | Yamamoto | 317/235 R |

FOREIGN PATENTS OR APPLICATIONS

| | | | |
|---|---|---|---|
| 2,003,334 | 11/1969 | France | 307/311 |
| 6,606,055 | 11/1966 | Netherlands | 317/235 |

OTHER PUBLICATIONS

Walker "Electron Beam Testing Apparatus" IBM Tech. Bull. Vol. 10 No. 2 July 1967 Pages 175–176

Hildebrand "Variable Resistor Element" IBM Tech. Bull. Vol. 4 No. 3 Aug. 1961 Page 91

Campbell "Tachometer Circuit" IBM Tech. Bull. Vol. 12 No. 1 June 1969 Page 102

Brownback "DC Motor Speed Control" IBM Tech. Bull. Vol. 13 No. 1 June 1970

*Primary Examiner*—Rudolph V. Rolinec

*Assistant Examiner*—R. E. Hart

*Attorney, Agent, or Firm*—R. S. Sciascia; Arthur L. Branning; Philip Schneider

[57] ABSTRACT

A frequency multiplier with a fixed multiplication factor comprising at least one p-n semiconductor junction diode and an electron beam for irradiating the p-portion of the diode. One form of the invention has diodes arranged in pairs, the input frequency modulating the beam to sweep it back and forth across the diodes once per input cycle. Another form has a mask across the face of a diode with undulations in the mask acting to vary the amount of current flow in the diode as the beam sweeps back and forth across the mask. A further form of the invention comprises sweeping the beam in a circle in one direction only either over a series of diodes or over a single diode which is covered with a mask.

7 Claims, 8 Drawing Figures

FREQUENCY MULTIPLIER AND HIGH FREQUENCY GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to frequency-multiplying devices and especially to a frequency-multiplying device in which one or more semiconductor junction diodes are irradiated by a modulated electron beam.

Electronic frequency multipliers are generally of the type in which a harmonic of some fundamental frequency (which is the frequency of the signal to be multiplied) is passed through a tuning filter. It is frequently difficult to maintain the tuning accuracy of the filter so that the frequency of the output signal may not be accurate.

OBJECTS

An object of this invention is to provide absolute multiplication accuracy in a frequency multiplier.

Another object is to determine the frequency multiplication factor of a frequency multiplier geometrically rather than electronically.

A further object is to provide inherent amplification in a frequency multiplier.

BRIEF SUMMARY OF THE INVENTION

The objects and advantages of the present invention are accomplished by deflecting or modulating an electron beam with an input signal so that a single motional cycle of the beam corresponds to a single cycle of the input signal. The beam is deflected across at least one p-n semiconductor junction diode so as to produce current flow therein in accordance with the area of irradiated surface of the diode. Multiplication of frequency is produced by the use of multiple diodes or alternate thick and thin sections of a mask over the surface of a diode.

Other objects, advantages and novel features of the invention will become apparent from the following detailed description of the invention when considered in conjunction with the accompanying drawings wherein:

DETAILED DESCRIPTION

Figures 1, 2:
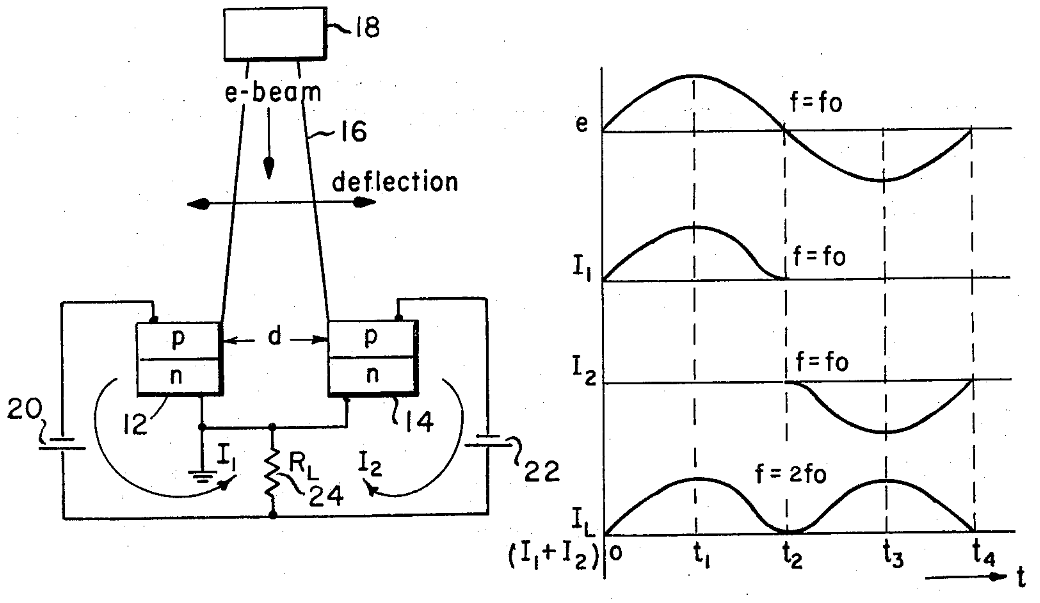
FIG. 1 is a schematic illustration of an embodiment of the invention which is useful for frequency doubling.
FIG. 2 is a graph showing voltage and current relations in the circuit of FIG. 1.

FIG. 1 shows in schematic form an embodiment of the invention which is a frequency doubler. A pair of p-n semiconductor junction diodes 12 and 14 are arranged so that their p-material surfaces are exposed to irradiation by an electron beam 16. The diodes 12 and 14 are spaced from each other by a distance *d* which is substantially equal to the width of the beam 16. The spacing is not critical for frequency multiplication but factors such as efficiency of the device and waveshape of the output signal depend on the shape of the *e*-beam, the width of the *e*-beam 16 relative to the spacing of the diodes, the width of the *e*-beam relative to the width of the irradiated surfaces of the diodes and the amount of deflection of the *e*-beam. For maximum efficiency and a sinusoidally shaped output, if the *e*-beam is circular in cross-section and the surfaces of the diodes are squares just large enough to circumscribe the circle, the beam should be deflected so that, at maximum deflection to the left, it completely fills the surface area of diode 12 and, at maximum deflection to the right, it completely fills the surface area of diode 14.

The deflection of the *e*-beam 16 occurs in response to an input signal *e*, the signal whose frequency is to be multiplied. This signal is applied to the deflection plates of an electron-beam generating device 18. The diodes 12 and 14 are built into this device.

The diodes 12 and 14 are connected to an output circuit comprising biasing sources 20 and 22 for the diodes and a load resistance 24 ($R_L$). The connections are push-push so that the current $I_1$ from diode 12 flows through the load 24 in the same direction as the current $I_2$ from diode 14. The currents are shown in FIG. 2. At time o, the *e*-beam falls between the diodes because the deflecting signal e is zero, and all currents are zero. As signal e increases the beam is deflected by an increasing amount across the surface of diode 12 and current $I_1$ increases. No current $I_2$ flows because there is no irradiation of diode 14. The deflection and current $I_1$ increase to a maximum at $t_1$ and then fall gradually to zero at $t_2$ when the beam is again back to its initial position. Between $t_2$ and $t_3$ the beam sweeps to the right across diode 14, $I_2$ gradually increasing to a maximum at $t_3$ where the deflecting signal *e* has its negative maximum value. From $t_3$ to $t_4$, the beam sweeps back to its original quiescent position and $I_2$ decreases gradually to zero.

The output signal $I_L$ being a summation of $I_1$ and $I_2$, is a sinusoidally shaped wave with a frequency twice that of the frequency of the input sinusoid *e*.

A more general mode of operation of this circuit would be to deflect the beam completely across each diode before traversing it in the opposite direction. Thus, in FIG. 1, the beam would sweep to the left of the diode 12, then return across diodes 12 and 14 to the right of the diode 14, then come back across the diode 14 to its quiescent position. In this case, there would be four pulsations of current through the load 24, or a frequency multiplication factor of 4. Thus, in general, for full deflection in translational motion of the beam across divided pairs of diodes such as shown in FIGS. 1 and 3, the multiplication factor would be 2X, where X is the number of diodes.

Figure 3:
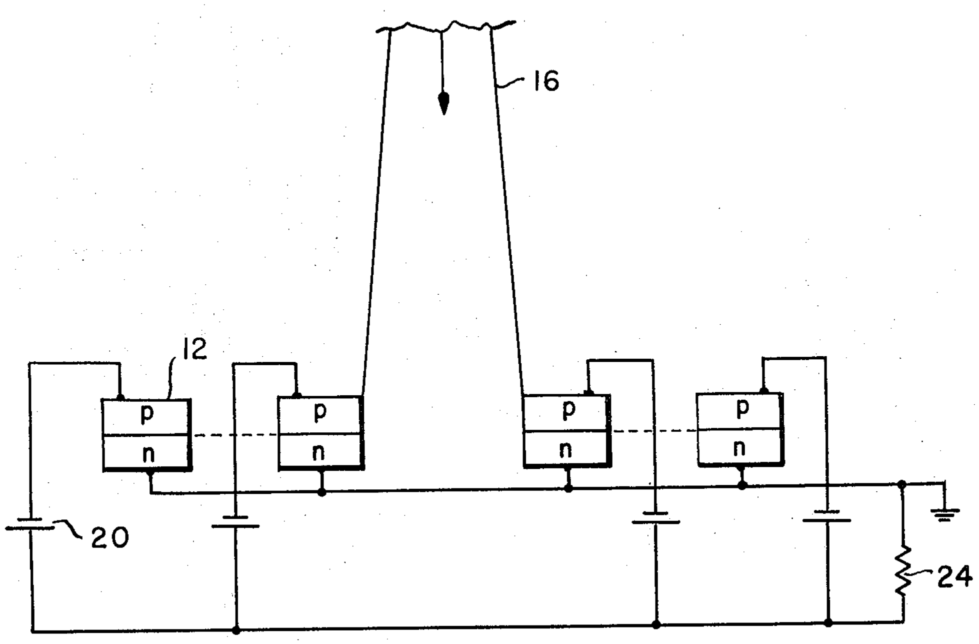
FIG. 3 is a schematic illustrating the general expanded version of the circuit of FIG. 1.

FIG. 3 illustrates the circuit arrangement for a plurality of diodes 12 on the left and right sides of the *e*-beam 16. The number of diodes on the left should equal the number on the right. If there are six diodes on each side, the frequency multiplication factor will equal 24. Multiple diodes can also be arranged in a circle with the *e*-beam being arranged for circular deflection in a single direction, either clockwise or counterclockwise. For circular arrangements of diodes, the frequency multiplication factor is equal to the total number of diodes.

It can be seen from the embodiments shown thus far that the beam deflection can be linear or circular and either unidirectional or bidirectional (back and forth as in FIGS. 1 and 3).

Figure 4:
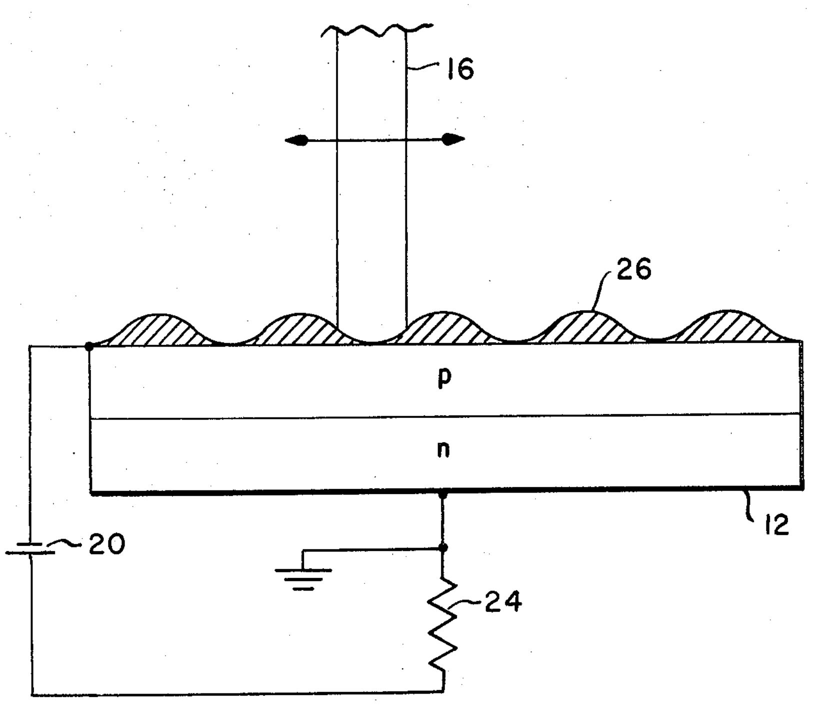
FIG. 4 is a schematic illustration of another embodiment of the invention employing a single diode and a metallic mask for the irradiated surface.

A single junction diode can be employed as shown in FIG. 4, for example. In this embodiment, a mask 26 is affixed to the irradiated surface of the diode 12. This is a metallic mask which is shaped to provide alternating thin and thick regions; a high current flows in the diode when the *e*-beam 16 sweeps across a thin region and a low current when the *e*-beam sweeps across a thick region. The mask shown provides a frequency multiplication factor of five. The exact period and wave shape of each output current pulsation is determined by the *e*-beam sweep rate and by the spacing variations and thickness variations of the metal mask. By appropriate control of these, an output sinusoid can be obtained.

Figure 5A:
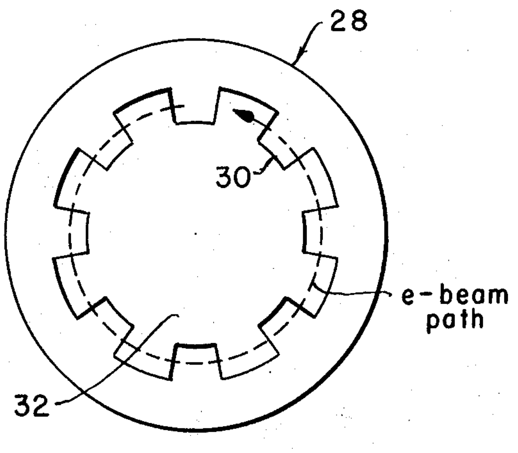
FIG. 5A is a schematic illustration of a third embodiment employing a circular beam path.
Figure 5B:
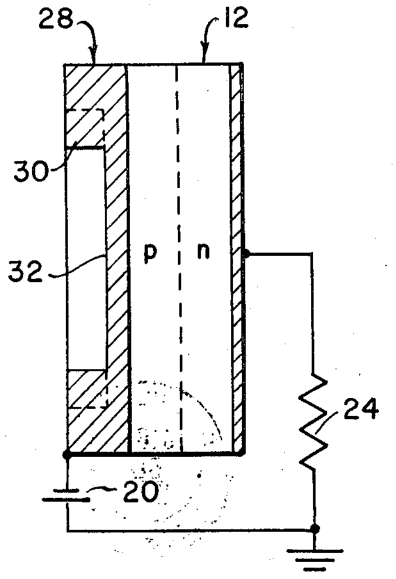
FIG. 5B is a side view of the masked diode shown in front view in FIG. 5A;.

FIGS. 5A and B show another version of the invention. Here the semiconductor junction diode 12 is circular in shape. The metallic mask 28 has a thin, inner circular area 32 and a thicker peripheral area which is cut out to form spaced teeth 30 which point inwardly. Typical thicknesses might be 1 mil for the thick region. In the quiescent state, the *e*-beam can strike the center of the device which can be formed with a hole through it (not shown) from front to rear. The beam can strike a grounded target plate in the rear (not shown). The *e*-beam is deflected in a circular fashion along the dotted path so that it traverses the teeth 30 of the mask. Circular deflection may be effected by a Cuccia coupler or by quadrature-phased, electrostatic deflection plates for example. The frequency multiplication factor depends on the number of teeth and the factor may be an odd number. For a 5 mm. diameter diode and teeth which are 25 microns wide, a multiplication factor of 300 can be obtained so that an input frequency of 100 MHZ could provide a 30 GHZ output frequency.

The output waveshape and ratio of on-time to off-time can be controlled by the shape of the teeth 30 and the distance between the teeth. By varying the shape of the teeth with the radius and by deflecting the beam properly, the output waveform can be made a function of the beam deflection amplitude since the beam would intercept different geometries at different radial lengths.

Figure 6:
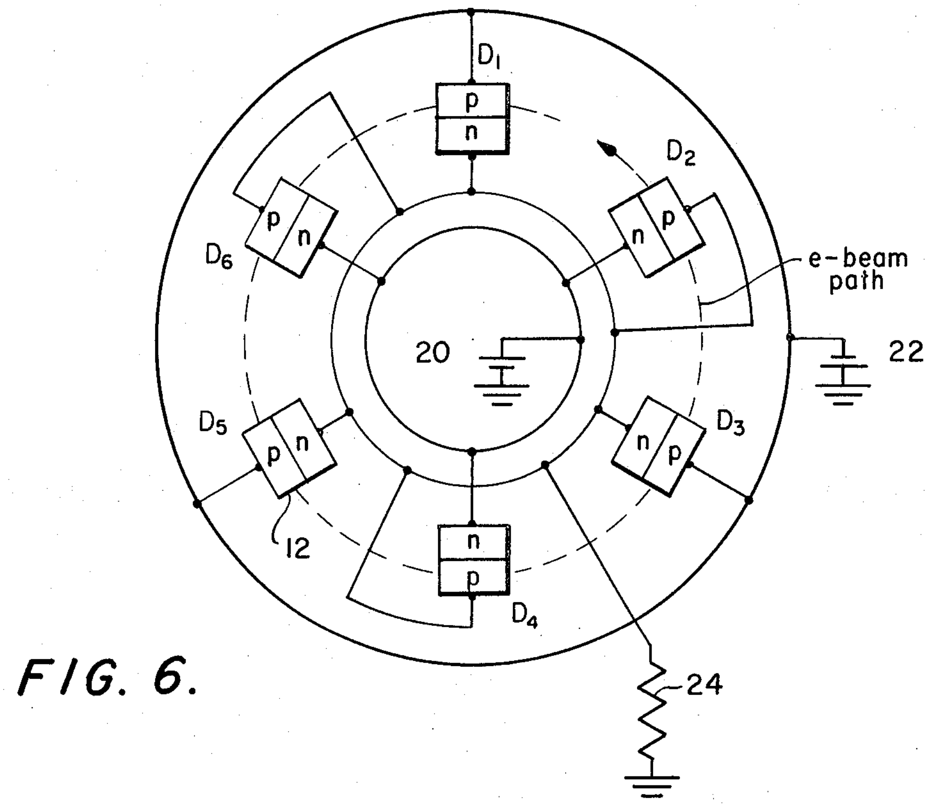
FIG. 6 is a schematic illustration of a version of the invention in which the output has no d.c. component.

FIG. 6 shows a version of the invention which provides an output waveform which has no d.c. component. A d.c. component was present in the outputs of all previous versions of the invention. Here the target consists of two interleaved sets of p-n diodes, the diodes in each set being connected in parallel and the sets being arranged (push-pull) so that the current from one set flows through the load in the opposite direction from the current from the other set. The diodes can be arranged circularly as shown for circular deflection of the e-beam.

One set of diodes consists of D1, D3 and D5, the other of D2, D4 and D6. The e-beam irradiates the p-section of each diode. This invention gives an even multiplication factor since the diodes must be in sets of two. Since this version has a zero d.c. output component, it is more efficient in the generation of the harmonic output power.

Figure 7:
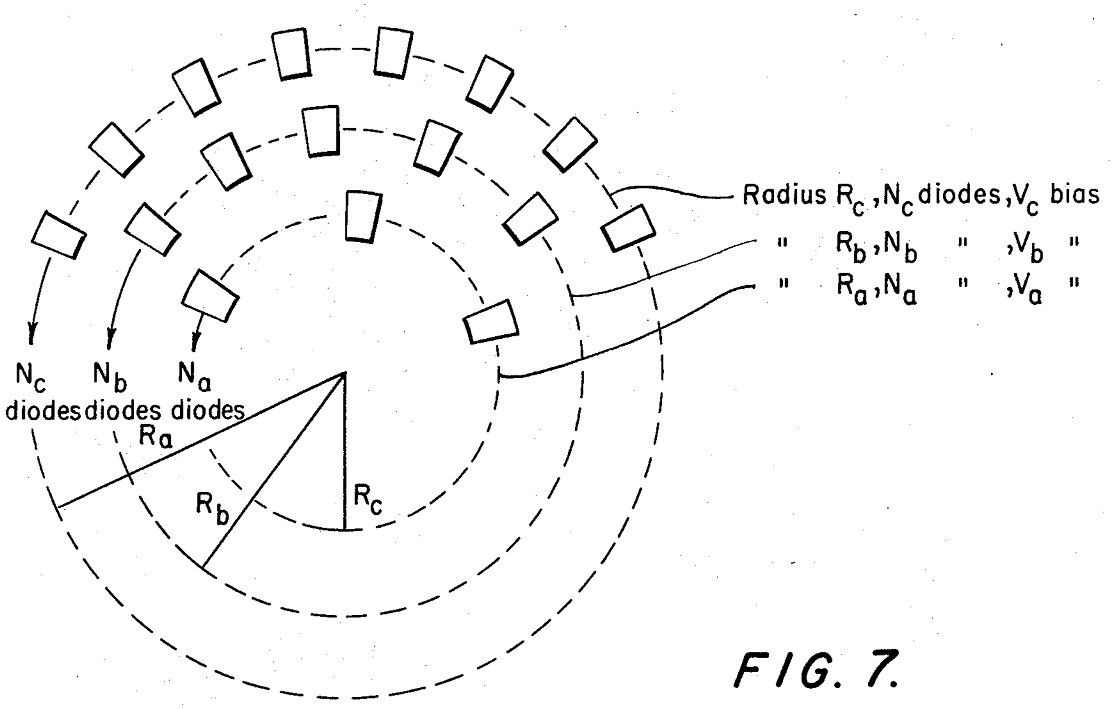
FIG. 7 is a schematic illustration of how the invention can be adapted for switching to different power levels and frequencies in the output.

To provide switching between two or more different power levels and/or two or more different output frequencies, two or more sets of consecutive rings of diodes may be provided (see FIG. 7). When the e-beam is switched to radius $R_a$, the output has power $P_a$ and frequency $f_a$; for radius $R_b$, the output power is $P_b$ and the output frequency $f_b$; etc. The loads for the three sets of diodes may be separat or common but the power supplies will generally be separate.

A major advantage of this general scheme is that for a frequency multiplication factor of N, each diode carries approximately 1/N-th of the output power load, i.e., it conducts only one rf output cycle every N cycles for a duty factor of 1/N. Therefore, for a given time average output power or c.w. output power, each diode need handle only 1/N-th of the total. For a given power level, the diodes can be made thinner and smaller and hence reach higher frequencies. For a given frequency, higher powers can be attained because dissipation is distributed among the diodes and because the diodes are spread out over a large geometrical area thus facilitating heat removal.

Obviously many modifications and variations of the present invention are possible in light of the above teachings. It is thereto to be understood that within the scope of the appended claims the invention may be practiced otherwise than as specifically described.

What is claimed and desired to be secured by letters patents of the United States is:

1. A frequency-multiplying device comprising, in combination:

electron-beam (*e*-beam) generating and deflecting means;

p-n semiconductor junction diode means; and circuit means to which said diode means is connected for providing a bias supply and a load for said diode means, said *e*-beam means being arranged to sweep across the *p*-surface of each said diode means from a position on one side of the diode means in which the beam does not impinge on the p-surface to a position on the other side in which the beam again does not impinge on the *p*-surface, the input signal whose frequency is to be multiplied being connected to said *e*-beam means to deflect said beam, each cycle of said input signal generating at least two cycles of output current through said load.

2. A device as in claim 1, said diode means comprising at least two diodes connected to said load in such arrangement that current from each diode flows through said load in the same direction.

3. A device as in claim 2, said diodes being arranged in a straight line on opposite sides of the quiescent position of said e-beam which is arranged to be deflected back and forth over said diodes once per cycle of said input signal.

4. A device as in claim 2, said diodes being arranged around the perimeter of a circle, said e-beam being connected to be deflected once around said circle per cycle of said input signal across the p-surfaces of said diodes.

5. A device as in claim 1, said diode means comprising a single diode, and said device further including masking means placed over the p-surface of said diode so that said e-beam must penetrate said masking means to reach said p-surface.

6. A device as in claim 5, wherein the surface of said masking device consists of at least one thick and one thin area, said e-beam sweeping back and forth over these areas once per cycle of said input signal.

7. A device as in claim 5, wherein said masking device is formed as a circle having alternating thick and thin regions along a circular path, said e-beam traversing said circular path completely for each cycle of said input signal, there being at least two said thick and two said thin regions in said mask.

* * * * *